United States Patent [19]
Heller et al.

[11] Patent Number: 5,854,169
[45] Date of Patent: *Dec. 29, 1998

[54] PHOTOCATALYST-BINDER COMPOSITIONS

[75] Inventors: Adam Heller; Michael V. Pishko, both of Austin, Tex.; Ephraim Heller, Oakland, Calif.

[73] Assignee: E. Heller & Company, Alameda, Calif.

[*] Notice: The term of this patent shall not extend beyond the expiration date of Pat. No. 5,616,532.

[21] Appl. No.: 853,431

[22] Filed: May 9, 1997

Related U.S. Application Data

[60] Continuation of Ser. No. 700,911, Aug. 21, 1996, which is a division of Ser. No. 327,016, Oct. 21, 1994, Pat. No. 5,616,532, which is a continuation-in-part of Ser. No. 216,731, Mar. 22, 1994, abandoned, which is a continuation-in-part of Ser. No. 143,301, Oct. 26, 1993, abandoned, and Ser. No. 143,286, Oct. 26, 1993, abandoned.

[51] Int. Cl.$^6$ ............... B01J 21/06; B01J 21/08
[52] U.S. Cl. .......... 502/242; 502/248; 502/250; 502/253; 106/286.3; 106/286.4; 106/286.6; 106/287.1; 106/287.12; 106/287.13; 106/287.14; 106/287.19
[58] Field of Search ............ 502/242, 248, 502/253, 250; 106/286.3, 286.4, 286.6, 287.1, 287.12, 287.13, 287.14, 287.19

[56] References Cited

U.S. PATENT DOCUMENTS

| | | |
|---|---|---|
| 3,085,952 | 4/1963 | Odioso . |
| 3,244,639 | 4/1966 | Mindick . |
| 3,347,816 | 10/1967 | Krauss . |
| 3,451,833 | 6/1969 | Bonitz . |
| 3,907,581 | 9/1975 | Willcox . |
| 3,976,497 | 8/1976 | Clark . |
| 4,127,466 | 11/1978 | McKenzie . |
| 4,209,432 | 6/1980 | Roth . |
| 4,264,421 | 4/1981 | Bard . |

(List continued on next page.)

FOREIGN PATENT DOCUMENTS

| | | |
|---|---|---|
| PH7074 | 7/1987 | Australia . |
| 600289 B2 | 5/1990 | Australia . |
| 0 233 498 A2 | 5/1987 | European Pat. Off. . |
| 2 116 640 | 8/1972 | France . |
| 3 237 205 A1 | 4/1984 | Germany . |
| 63-097234 A2 | 4/1988 | Japan . |
| 63-100042 | 5/1988 | Japan . |
| 63-248 443 A2 | 10/1988 | Japan . |
| 63-302 856 | 12/1988 | Japan . |
| 63-315 138 | 12/1988 | Japan . |
| 01 139 139 | 5/1989 | Japan . |

(List continued on next page.)

OTHER PUBLICATIONS

Abramov et al., Lakokrasoch Mater, Ikh Primen., 1:10–13, 1973.
Al–Ekafi, H., Can. J. Chem., 67:1061–1064, 1989.
Allen, et al., Chemical Abstracts #CA88(4);23639, 1977.
Allen, et al., Chemical Abstracts #CA117(8):70472p, 1992.
Amadeli, R., J. Chem. Soc. Faraday Trans., 87:3267–3273, 1991.
Bhakta, D., Environ. Sci. Technol., 26:625–626, 1992.
Brownbridge, Chemical Abstracts CA114(26):249332h, 1990
Cutrone, et al., Chemical Abstracts #CA110(14):116692, 1988.

(List continued on next page.)

*Primary Examiner*—Neil McCarthy
*Attorney, Agent, or Firm*—Merchant, Gould, Smith, Edell, Welter & Schmidt, P. A.

[57] ABSTRACT

A photocatalyst composition containing a substantially non-oxidizable binder which allows large amounts of photocatalytic particles to be adhered to a surface. Upon application to a surface, the composition dries or cures to form an adherent, abrasion-resistant, thermostable, and photocatalytic coating.

32 Claims, 1 Drawing Sheet

U.S. PATENT DOCUMENTS

| | | |
|---|---|---|
| 4,275,118 | 6/1981 | Baney et al. . |
| 4,544,470 | 10/1985 | Hetrick . |
| 4,619,838 | 10/1986 | Meier . |
| 4,731,264 | 3/1988 | Lin . |
| 4,774,026 | 9/1988 | Kitamoni . |
| 4,788,038 | 11/1988 | Matsunaga . |
| 4,810,305 | 3/1989 | Braun . |
| 4,892,712 | 1/1990 | Robertson . |
| 4,954,465 | 9/1990 | Kawashima . |
| 4,997,576 | 3/1991 | Heller . |
| 5,030,607 | 7/1991 | Colmenares . |
| 5,045,288 | 9/1991 | Raupp . |
| 5,164,003 | 11/1992 | Bosco . |
| 5,183,656 | 2/1993 | Uesaka et al. . |
| 5,194,161 | 3/1993 | Heller . |
| 5,246,737 | 9/1993 | Muradov . |
| 5,256,616 | 10/1993 | Heller . |

FOREIGN PATENT DOCUMENTS

| | | |
|---|---|---|
| 01 159 030 A2 | 6/1989 | Japan . |
| 01 159 032 | 6/1989 | Japan . |
| 01 189 322 A2 | 7/1989 | Japan . |
| 01 218 635 A2 | 8/1989 | Japan . |
| 01 252 244 A2 | 10/1989 | Japan . |
| 01 288 321 A2 | 11/1989 | Japan . |
| 01 288 322 A2 | 11/1989 | Japan . |
| 01 159 033 | 12/1989 | Japan . |
| 02 207 823 A2 | 8/1990 | Japan . |
| 0394 814 | 4/1991 | Japan . |
| 03 106 420 | 5/1991 | Japan . |
| 3 290 483 | 12/1991 | Japan . |
| 04 284 851 A2 | 10/1992 | Japan . |
| 04 327 851 A2 | 11/1992 | Japan . |
| 04 334 552 A2 | 11/1992 | Japan . |
| WO9000085A1 | 1/1990 | WIPO . |
| WO91/09823 | 7/1991 | WIPO . |
| WO93/17971 | 9/1993 | WIPO . |

OTHER PUBLICATIONS

De Baetselier et al., Fermentation of a Yeast Producing A. Niger Glucose Oxidase: Scale–up, Purification and Characterization of the Recombinant Enzyme, Jun. 1991.

Dibble, L. et al. *Environ Sci. Technol.*, 26:492–5, 1993.

Djeghri, N. et al., *Faraday Discuss. Chem. Soc.*, 58, 185–93, 1975.

Formenti, M. et al., Chemical Abstracts #CA86(13):88820b, 1976.

Formenti, M. et al., Chemical Abstracts #CA86(5):29191z, 1976.

Formenti, M. et al., *Catal. Proc. int. Congr.*, 5th Meeting Date 1972, vol. 2, 70–1011–23, edited by J. Hightower et al., 1973.

Formenti, M. et al., Chemical Abstracts #CA76(23):139890c, 1972.

Formenti, M. et al., Chemical Abstracts #CA76(5):24368w, 1971.

Formenti, M. et al., Chemical Abstracts #CA72(19):99795j, 1970.

Fukasawa, *Journal of Nuclear Science and Technology*, 28:27–32, 1991.

Gregg et al., *J. Phys. Chem.*, vol. 94, No. 15, 1991, 6976–5980.

Heller, E. "NIST Awards $2 Million Contract to EHC/LIGHTSTREAM FOR DEVELOPMENT OF NEW PHOTOCATALYST TECHNOLOGY," press release Aug. 16, 1995, pp. 1–3.

Hilgendorff, M., *The First International Conf. on Advanced Oxidation Technologies for Water and Air Remediation, London*, Ontario, Canada, jun. 25–30, 1994, "Principles of TiO2 Photocatalysis: Mechanisms of Reduction and Oxidation Processes, Importance of Surface Complexation".

Hofstadler, K., *Environ. Sci. Technol.*, 28:670–674, 1994.

Hsiao, Chen–Yung, *Journal of Catalysis*, 82:418–423, 1983.

Jackson, J. *Electrochem. Soc.*, 138:3660–4, 1991.

Julliet, F. et al., Chemical Abstracts #CA83(8):65919q, 1973.

Julliet, F. et al., Chemical Abstracts #CA80(5):26727u, 1973.

Katakis, et al., *Anal. Chem.*, 64, 1008–1013 (1992).

Kawashima, M. et al., Chemical Abstracts #CA115(16):165628s, 1991.

Kawashima, M. et al., Chemical Abstracts #CA113(24):218285h, 1990.

Kobayashi, T., *J. Phys. Chem.*, 87:768–775, 1983.

Kraeutler, B., *Journal of the American Chemical Society*, 100:13 4317–4318, 1978.

Kuhler, R. et al., *Environ. Sci. Technol.*, 27:2104–2111. 1993.

Lay, P. et al., Pentaamineosmium(III) and Hexaammineosmium(III) Complexes, *Inorganic Syntheses*, vol. 24, edited by J. Shreeve et al., 1996.

Mackor et al., Chemical Abstracts #CA112(16):14130v, 1988.

Makor et al., 1989 Chemical Abstracts #CA111(26):235088j, 1987.

Matsumoto, Y., *J. Electrochem. Soc.*, 138:1259–1263, 1991.

Matthews, R., 1988, Chemical Abstracats #CA108(8):62183u, 1988.

Moellers, F., *J. Electrochem. Soc*, 121:1161–1167, 1974.

S. Nakamura et al., *Biochimica et Biophysica Acta.* 445(1976) 294–308.

Nimlos, M. et al., 1993 Chemical Abstracts #CA118914):131288c.

Ohtani et al., 1989 Chemical Abstracts #CA111(2):7940A.

Ohtani et al., Chemical Abstracts #CA116(10):84330q, 1991.

Ollis & El–Ekabi (eds), Photocatalytic purification and treatment of water and air Conference Proceedings, Intl. Conf. on TiO2, Can 1992.

Patel, K., *Chemical Abstracts*#CA114(22):217857s, 1991.

Peral, J. et al., *J. Catal.*, 136(2), 554–65, 1992.

Sawicki, E. et al., *Analytical Chemistry*, vol. 33, No. 1, Jan. 1961.

Schuhmaann, W., et al., *J. Am. Chem. Soc.*, 113, 1395–1397 (1991).

Serpone, et al., 1986 Chemical Abstracts #CA105(22):200341.

Soria, J., et al., *The Journal of Physical Chemistry*, 93:274–282, 1991.

Thevenet, A. et al., *Chemical Abstraacts*#CA83(8):69007p., 1974.

Vinodgopal, K., *The First International Conference on Advanced Oxidation Technologies for Water and Air Remediation* London, Ontario, Canada, Jun. 25–30, 1994.

Voelz, et a., 1981, Chemical Abstracts #CA94(22):176781k.

Wang, C., et al., *J. Am. Chem. Soc.*, 114:5230–5234, 1992.

Yasuda, Y. et al., *Biochemistry*, 10:2624–30, 1971.

Ye, L., et al., *Anal. Chem.* 65:238–241 (1993).

PHOTOCATALYST-BINDER COMPOSITIONS

RELATED APPLICATIONS

This application is a continuation of U.S. patent application Ser. No. 08/700,911, filed Aug. 21, 1996; which is a divisional of U.S. patent application Ser. No. 08/327,016, filed Oct. 21, 1994, now U.S. Pat. No. 5,616.532; which is a continuation-in-part of U.S. patent application Ser. No. 08/216,731, filed Mar. 22, 1994, abandoned; which is a continuation-in-part of U.S. patent application Ser. Nos. 08/143,286 and 08/143,301, both filed Oct. 26, 1993, both abandoned.

FIELD OF THE INVENTION

This invention relates to compositions containing a photocatalyst and novel binders and to methods of using such compositions. The binders permit the photocatalyst to adhere to a surface without loss of chemical reactivity of photocatalyst. In addition, the composition of the invention does not exhibit damage to the binder or to the underlying surface upon exposure to light absorbed by the photocatalyst. In a preferred embodiment, a hydrophobic and oxygen permeable binder or added hydrophobic and oxygen permeable overcoating enhances photocatalytic activity.

BACKGROUND OF THE INVENTION:

Heterogeneous photocatalysis has shown promise as a chemical method for oxidizing and thereby removing unwanted organic compounds from fluids, including water, and air. A UV-illuminated catalyst, such as titanium dioxide, absorbs UV light, which produces electrons and holes that migrate to the surface of the catalyst. At the surface, the electrons reduce adsorbed oxygen, while the holes oxidize organic compounds or adsorbed water molecules.

For example, titanium dioxide is a semiconductor with a band gap of 3.0 eV (rutile) and 3.2 eV (anatase). When a photon having an energy in excess of the band gap is absorbed by the pigment particle, an electron is promoted from the valence band to the conduction band. The promotion of the electron produces a "hole." The hole and the electron may diffuse to the surface of the pigment particle where each may chemically react. Surface electrons generally reduce adsorbed oxygen, while surface holes generally oxidize organic compounds or adsorbed water molecules. When electron vacancies (holes) react with water, reactive OH radicals and protons are formed.

In related U.S. Pat. No. 5,256,616 and related U.S. patent application Ser. No. 08/244,149, ceramic beads coated with titanium dioxide efficiently induced the oxidation of oil on water when exposed to natural sunlight. Others have also utilized photocatalytic reactions to remove contaminants from air and water. See, for example, U.S. Pat. No. 5,045,288 to Raupp et.al.; PCT Patent Application No. PCT/US90/07651 to Lichtin et al. published Jul. 11, 1991; Japanese Kokai Patent Application No. Sho63[1988]-100042 to Kume, published May 2, 1988; and Australian Patent Application No. PH7074, Jul. 22, 1987 of Matthews.

While the use of photocatalysts for the removal of organic pollutants is generally known, a commercially feasible process for the use of such catalysts has not been developed. Known methods for adhering the photocatalyst to a reactive surface such as heat sintering have been impractical or too expensive to apply to very large surface areas such as those for air cleaning or the production of large areas of self-cleaning surfaces. In a fluid reactor, e.g., for air or water, a large photocatalytic surface area in contact with the air or water to be cleaned is advantageous. In prior art methods of bonding the photocatalyst to a surface, such as sintering, the actual catalyst surface area per unit geometric area was reduced. Consequently, reactors functioning at a given flow rate, required large catalyst-coated surface areas. This not only increased the required size of the reactor, but also created a large pressure drop in the reactor, making the reactor expensive to operate. Because rates of removal of contaminants from air or water in a reactor have been too low to justify the high costs involved and photocatalytic air or water cleaning and reactors have not been introduced for general use, i.e., for cleaning air in office buildings, homes, restaurants or factories, or for cleaning water in homes or municipal water plants.

The photocatalyst compositions of the prior art are not easily applied to substrates; and especially to those having a large geometric surface area such as walls, windows and the like. Typically, such compositions are generally applied as an aqueous slurry, and are poured, sprayed, dipped, or otherwise coated onto a substrate as a thin film. The photocatalyst is adhered to the substrate by heat sintering or calcifying. To gain any thickness of the photocatalyst film, the process must be repeated many times.

When pigments such as titanium oxide ($TiO_2$) are used in paints, hydrocarbon binders such as latex or polyurethane are generally used to adhere the pigment particles to each other and to a surface. Since photocatalytic activity of the pigment particles has been considered undesirable in paint, e.g., due to destruction of the hydrocarbon binders and the like, considerable effort is made to prevent it. This is because the oxidative reactions of the photocatalyst in the presence of sunlight and air degrade the polymeric hydrocarbon binder and causes undesirable "chalking" of the paint.

To mask the activities of the photocatalyst, the $TiO_2$ pigment particles in paints are generally enveloped or coated with a nonporous composition containing aluminum oxide ($Al_2O_3$), silicon dioxide ($SiO_2$), or both. These include, for example, $TiO_2$ pigments available from Kronos, Inc., Houston, Tex. as catalog numbers 1000, 1070, 1072, and 1074; Lansco 8042 from Landers Segal Color Co., Passaic, N.J. This overcoating prevents diffusion of electrons or holes to the pigment surface thereby preventing contact and reaction with the polymeric binder, e.g., latex or polyurethane, or with water or oxygen. Essentially all of the $TiO_2$ pigment used today in the manufacture of paints is rendered less photoactive by overcoating with aluminum oxide, silicon dioxide, or both. While this overcoating permits application of the pigment to a surface and preserves the appearance of a painted surface, it precludes photocatalytic reactions desired to remove contaminants from a surface, air or water.

To solve these problems and to produce a photocatalyst-binder composition useful in a variety of applications, it has surprisingly been found that photocatalyst particles adhere to a substrate by the use of substantially non-oxidizable binders. Being permeable to the organic contaminant-reactant and to oxygen, as well as their reaction products, carbon dioxide and water, such binders do not impede, and can even enhance, photocatalytic activity.

SUMMARY OF THE INVENTION

The invention provides a photocatalytic composition including a photocatalyst and a binder for adhering the photocatalyst particles to a surface. The binder permits application and adherence of the photocatalyst to a variety of surfaces without significantly impeding or blocking the activity of the photocatalyst. In some instances, the binder can even enhance photocatalytic activity. The binder of the photocatalytic composition is not degraded and its appearance is not altered by the activity of the photocatalyst.

The binder can be thermosetting as defined, infra, on page 7. When a dispersion of the photocatalyst and binder is applied to a surface, the composition dries and/or cures to form an abrasion-resistant, stable composition which adheres to most any surface, including metal, glass, plastic, wood, fiber and painted surfaces.

The dried and/or cured binder composition, in the absence of photocatalyst, transmits ultra-violet (UV) light. In the presence of a UV-absorbing photocatalyst, the transmitted UV-light is absorbed by the catalyst, and is thereby prevented from reaching an underlying surface.

UV-induced photocatalytic reaction gradually oxidizes the composition but, upon complete oxidation of the binder, the photocatalytic composition of the invention remains adhered to a surface through the binder or its oxidation product, and is present on the surface as a transparent, non-volatile film.

The binders of the present invention permit the photocatalytic composition to adhere to a geometric surface without heating. Thus surfaces that previously could not be coated by sintering methods because of a necessary heating step, such as plastics and fibers, may now be coated with the inventive photocatalyst-binder composition.

The binders of the present invention have a high Brunauer-Emmett-Teller (BET) surface area resulting from permeability of the binder and/or microporosity of the composition.

In a preferred embodiment, the photocatalyst useful in the invention is selected from the group consisting of photoactive transition metal oxides, including, but not limited to $TiO_2$, $ZnO$, $WO_3$, $SnO_2$, $CaTiO_3$, $Fe_2O_3$, $MoO_3$, $NbO_5$, $Ti_xZr_{(1-x)}O_2$, and to silicon carbide, SiC. In the preferred embodiments, the binder composition is formed of substantially permeable and UV-transmitting silicone, porous alumina or silica, boron oxide, silicone, or mixtures thereof.

Further, according to the present invention, the photocatalyst composition is employed to remove contaminants from air and water, as well as to remove undesirable organic material contacting a surface area such as a wall, window, flooring, automobile exterior, boat surface, and the like. In a preferred embodiment, the photocatalyst composition of the present invention is incorporated onto or in conjunction with a particle filtering device for removal of particulate contaminants from an air or water stream passing through the device.

DETAILED DESCRIPTION OF THE INVENTION

When used herein, the following definitions define the stated term:

"Thermosetting" means the ability of the fluid or deformable composition to be dried, hardened, or cured by removal of liquid, including at ambient temperature or by use of traditional curing agents including heat and UV radiation, or by polymerization and crosslinking agents, or by a combination of these.

"Abrasion resistant" means the ability of the dried or cured composition not to be easily scratched or flaked away from a surface. Abrasion resistance is measured, for example, in the paint industry, by a scratch hardness test. This test is described in: *Paint and Surface Coating: Theory and Practice*, R. Lambourne ed, 1987, John Wiley and Sons, N.Y., p. 674–5. In its simplest form, this test uses a range of pencils having varying carbon hardness values, e.g., the softest pencil is a No. 1 ranging to a No. 4 as a harder pencil carbon. The coated surface is rubbed or written with each pencil. The abrasion-resistance value given-to each surface can be defined as the maximum carbon hardness value, e.g. Pencil No., which runs across the surface without breaking the film or coating or can be defined as the softest pencil that will break the surface. Herein, the latter is used, e.g., the abrasion-resistance value is the number of the hardest pencil which does not break the coating. In the present invention, the preferred abrasion resistance value of the photocatalytic composition is at least 2, and is generally in the range of 2–3.

"Adherence" to a surface means the ability to be retained on the surface and may be tested, for example, by the "tape test." A piece of cellophane tape is adhered to the dried or cured composition and then removed. The compositions of the present invention will not be significantly pulled off the surface to which they has been applied, e.g., by the tape test.

"Thermostable" means the dried or cured compositions of the present invention will not be appreciably altered by normal changes in ambient temperatures, e.g., in the approximate range of 0° C. to 50° C. The temperature range at which the photocatalytic compositions will be active extends at least from about 0° C. to about 150° C.

The phrase "transmits ultraviolet light" means that the binder (in the absence of photocatalyst) when dried or cured and when illuminated with a source of ultraviolet light, is capable of transmitting through its thickness at least about 50% of the normally incident and non-reflected 340–380 nm photon flux, when the thickness of the neat binder layer is about 1 μm. The preferred binders transmit at least about 50% of this same photon flux through a 10 μm thick layer of the neat binder. With the addition of UV-absorbing photocatalyst, however, the cured and dried photocatalyst composition reduces the flux at the wavelength exciting the photocatalyst by about a factor of two or more, to the underlying surface, as the UV light is absorbed by the photocatalyst.

The term "substantially non-oxidizable" means the binders of the present invention have a backbone structure containing few oxidizable atoms. Preferably, the binders of the present invention have a backbone sequence of about 12 or more atoms, where no more than one in 6 atoms, and more preferably no more than 1 in 12 atoms is a carbon atom. The preferred binders do, however, contain oxidizable carbon and/or hydrogen atoms covalently bound to the backbone atoms.

The photocatalytic compositions of the present invention include a photocatalyst dispersed within a binder that can be thermosetting and which is substantially non-oxidizable after curing. The binder or binder precursor may be a polymerizable precursor, a non-crosslinked polymer, or a crosslinked polymer, provided the photocatalyst can be co-dispersed with the binder, and be easily spread over a geometric surface, i.e., a surface area to be coated with the catalyst. Note that the actual surface area, e.g., the area of the active photocatalyst in contact with fluid to be cleaned, may be much larger than the geographic surface area because of the three-dimensional nature of the photocatalyst-binder matrix.

The photocatalytic composition preferably is sufficiently fluid to be coated onto a surface by dipping or spraying. When dried or cured on a surface, the photocatalytic composition should desirably form an abrasion-resistant, thermostable composition which is capable of adhering to the surface and of transmitting ultraviolet light to the photocatalyst contained therein. Upon complete oxidation, the binder should remain adhered to the surface as a transparent, non-volatile film. The photocatalyst composition, when dried or cured on a surface, absorbs ultraviolet (UV) light and reduces its flux at the underlying surface, preferably to less than 10% of the flux at the outer surface.

Binders

The binders of the present invention do not interfere with the chemical reactivity of the photocatalyst (including photooxidation and photoreduction reactions), but permit ready access of the reactants to the surface of the photocatalyst and transmit UV light. After drying or curing or extended use of the photocatalyst they are substantially non-oxidizable, that is, their polymeric backbones contain few, if any, oxidizable atoms. Because significant oxidation of the binder would render the material non-adherent to a substrate or reduce transmittance of UV-light reducing its flux at the catalyst, substantially oxidizable binder is not useful in the present invention. The preferred binders do contain oxidizable carbon and or hydrogen atoms, not in the backbone, but covalently bound to the backbone atoms. The amount of such covalently bound oxidizable carbon and/or hydrogen atoms in the binders is low, that is, less than about 20 weight percent, and most preferably less than about 15 weight percent. After weathering or prolonged UV exposure, the oxidizable carbon content of the binders is preferably less than about 15 weight percent and most preferably less that about 10 weight percent. In the most preferred binders, carbon dioxide will be evolved upon-their oxidation. Upon exhaustive oxidation, the residual weight of the binder is at least about 70%, and preferably at least about 80%, of the initial weight of the binder.

The binder compositions dry or cure to form polymeric thermostable compositions, preferably having a weight average molecular weight of at least about 500 and polymeric backbones of about twelve or more bound atoms with no more than about one carbon atom in six in the backbone, and preferably no more than about one carbon atom in twelve.

In a preferred embodiment, the binders of the present invention are formed of porous alumina silica; silicone, or siloxane; or polymers or mixtures thereof. Boron oxide may be used, but is not preferred in applications in water due to the fact that it is slightly water soluble, producing boric acid. When aluminates or borates are used, acid may be added to cause their polymerization. Low molecular weight aluminates or borates in alkaline solutions may be polymerized by absorbing carbon dioxide from the atmosphere.

Porous alumina and silica, e.g., hydrated aluminum and silicon oxides, are commercially available e.g., under the trade name DISPAL, Vista Chemical. In contrast to the non-porous silica and alumina used by the paint industry to reduce or mask the photoactivity of the pigment particles, it has been surprisingly found that the binders of the present invention do not prevent photooxidation or photoreduction reactions. Small crystallites of silica or alumina (generally less than about 50 nm, preferably less than about 30 nm, and most preferably less than about 15 nm diameter) in the fluid binder composition contain oxygen-bound hydrogen atoms. Upon drying and curing they lose water, forming bonds between the crystallites of alumina, silica, and photocatalyst particles.

Silicates, aluminates, and borates, and mixtures thereof, also are suitable non-oxidizable binders for the photocatalytic particles of the present invention. When dried or cured onto a substrate, polysilicates, polyaluminates, or polyborates are formed. In general, acid is used to initiate polymerization; however, low molecular weight aluminates or borates in alkaline solutions can be polymerized through absorption of $CO_2$ from the air.

Silicones, including siloxane, are commercially available and may be applied to a surface as a prepolymer, a non-crosslinked polymer, or as a crosslinked polymer. The terms silicone, siloxane, polysiloxane, and polysilicone are interchangeably used, and refer herein to compounds having multiple sequential bonds of alternating Si and O atoms, where a substantial fraction of the Si atoms are also bound to either carbon or hydrogen atoms or both. The carbon atoms can be of alkyl or of aryl groups. Examples of alkyl groups include methyl, trifluoromethyl and ethyl. Examples of aryl groups include phenyl and benzyl.

The term silane encompasses all non-polymeric compounds of the element Si having bonds between silicon and carbon atoms and/or hydrogen, halogen, or other atoms. Herein, silanes are compounds that can polymerize to form a silicone by forming multiple sequential bonds of alternating Si and O atoms. In addition, vinyl silanes undergo vinyl polymerization reactions to form polyvinyl silanes and hydrosilylation reactions, where vinyl groups polymerize by reacting with Si-bound H atoms. Epoxy (glycidyl) silanes may polymerize by reactions opening their epoxy rings. A general discussion of silicones is found, for example in Kroschwitz, *Concise Encyclopedia of Polymer Science and Engineering,* 1990 Ed., page 1048.

Silanes (as defined above), silicone, siloxane, polysiloxane, polysilicone, silanols (precursors, that upon loss of water, form silicones or silica gel), silsesquioxanes (polysiloxanes having multiple rings of alternating silicon and oxygen atoms) and silica gels are useful in the binder compositions of the present invention. The preferred binder compositions are made with compounds in which silicon atoms are covalently bound to alkyl groups. These compounds are mixed with photocatalyst to form a thermosetting composition. When applied to a surface, the photocatalyst-binder composition dries or cures to form a thermosettable, abrasion resistant composition which adheres onto the surface.

Examples of useful polymeric precursors or prepolymers include dihalosilanes, trihalosilanes, tetrahalosilanes, alkyltrihalosilanes, dialkyldihalosilanes, aryltrihalosilanes, diaryldibalosilanes, dialkoxysilanes, trialkoxysilanes, tetraalkoxysilanes, alkyltrialkoxysilanes, and dialkyl-dialkoxysilanes. Examples include methyltrichlorosilane, $(CH_3SiCl_3)$, methyltrimethoxysilane $(CH_3Si(OCH_3)_3)$ methyltriethoxysilane, methyltripropoxysilane, and octyltriethoxysilane. These polymer precursors react to form two-dimensional polymers and three-dimensional crosslinked polymer networks.

Two dimensional silicone polymers include linear, cyclomer, and ladder forms. Linear forms include, for example, polydiethoxysiloxanes, polydimethoxysiloxanes; cyclomers include polysilsesquioxanes, e.g., poly (methylsilsesquioxane). Silsesquioxanes are polysiloxanes having multiple rings consisting of alternating Si and O atoms. A substantial fraction of the ring Si atoms is bound to a C or H atom, which may be bound, for example, to a methyl or trifluoromethyl group.

Crosslinked polymers are formed, for example, when silicon atoms of different chains are linked through oxygen atoms, and may form from alkoxy group carrying silicones through loss of ethers; their partial reaction with water and loss of alcohol; or from halogen-containing silicones by their reaction with water or hydroxyl ions and loss of halide. Crosslinking also may occur through oxidation by air, $O_2$ or peroxide, or by a N and O containing molecule, such as a nitrogen oxide or a nitrite or nitrate, or by an ion containing an oxidized halogen such as chlorite or hypochlorite. A silica gel, which is a crosslinked network of Si—O—Si bonds, terminated by Si—OH bonds, can also be used. Because Si can bond to four neighboring O atoms, the extent of crosslinking can be high in silica gels. Hydration, i.e., the presence of Si—OH groups terminating chains or networks, provides an open, high surface area structure where Si—OH groups couple upon heating to form a more dense structure with more Si—O—Si groups, by loss of water. A continuum of structures of decreasing porosity exist between $Si(OH)_4$ and fused quartz, $SiO_2$.

Prior to crosslinking, silicones, including siloxanes are usually liquids or solids that melt and are soluble in organic solvents and are dispersible in water. Prepolymers are generally soluble in alcohol, water and their mixtures. Some examples of solvents for polymerizable alkoxysilanes are alcohols, such as methanol, ethanol, and isopropanol and ethylene glycol; ketones, such as acetone and methyl ethyl ketone; alkanes, such as hexane and octane; aromatics, such as toluene and xylene; and others including N-methylpyrrolidone, diethylsuccinate, ethylene glycol diacetate, tetrahydrofuran, dimethylformamide, dimethylsulfoxide, and methylene chloride. The amount of water may vary with the polymerizable compound, but in general is about one-half to one mole of water per mole of alkoxy group on the polymer precursor. For example, analkyl trialkoxy silane precursoe would require one and one half to three water per mole of presursor. In general, alcohol is used at five times the amount of water.

It is preferred to use solvents which generate limited volatile organic compounds (VOC's). In general, about 10% by weight of the binder is placed in solvent, although the amount of binder may vary from about 0.1% to about 75%. In determining the amount of binder and solvent, consideration is given to the thickness of the layer to be produced and the viscosity of the desired composition for dispersing the catalyst and the application method to a specific surface.

Siloxanes can be crosslinked by reactions catalyzed by known curing agents, including organo-titanium compounds such as titanium isopropoxide. Crosslinked, three-dimensional siloxane networks can be suspended or dispersed in solvents or water, but usually do not dissolve.

In the present invention, the binder composition may include a non-crosslinked or partially crosslinked siloxane. Upon drying and curing of the composition on a surface, the non-crosslinked or partially crosslinked binder is further crosslinked to form thermostable, adherent coatings on the surface.

Although the silicon-based binder compositions are low in oxidizable carbon, it is preferred that they not be free of carbon. The presence of alkyl or aryl functions, or both, attached to the silicone, e.g., polysiloxane or cyclomer backbone e.g., as terminating functions, is preferred, as alkyl or aryl derived polysiloxanes or cyclomers form hydrophobic, smooth, difficult to oxidize, thermostable and hard films that are transparent (clear to translucent). The hardness, of these films can exceed 95 on the Rockwell M hardness scale and is generally in the range of 70 to 120. These are preferred binders when glossy, hard coatings are sought, for example in photoreactively self-cleaning waxes for use on surfaces, e.g., of automobiles or ceramic tiles or in photoreactively self-cleaning automobile paints, overcoatings, or finishes.

In general, the toughest binders that are also the hardest and most abrasion resistant, are the alkyl silsesquioxanes, particularly if cured with an organotitanate. Polysiloxanes formed by polymerizing alkyltrimethoxysilanes, particularly methyl trimethoxysilane under mildly acid conditions with about one mole of water added per alkoxy group in a dry solvent, such as alcohol, are softer, i.e., form tough, abrasion resistant, yet more plastic (deformable) coatings. Both are clear. The methyl silsesquioxane coating, even without further crosslinking by titanate, can be heated to a high temperature, e.g., in excess of 400° C., without decomposition.

Coatings made by polymerization of hydrogen carrying silanes such as $HSiCl_3$ or $HSi(OCH_3)_3$ cure in air by oxidation of the silicon-bound hydrogen atoms, loss of water and formation of Si—O—Si bonds.

Photocatalyst

Photocatalysts useful in the invention are generally photoactive transition metal oxides, including, but not limited to $TiO_2$, ZnO, $CaTiO_3$, $WO_3$, $SnO_2$, $MoO_3$, $Fe_2O_3$, $Nb_2O_5$, $Ta_2O_5$, and $Ti_x(Zr_{1-x})O_2$, where X has a value of between 0 and 1. SiC is also a useful photocatalyst. Preferred are $TiO_2$ and ZnO. The photoactive catalyst particles can be approximately between 1 and 100 nm in diameter, however, the photocatalytic properties of smaller particles are superior to those of the larger particles. The preferred photocatalyst particles are between about 1 and about 50 nm in diameter, consisting of approximately 1–10 nm crystallites.

The preferred photocatalyst particles have a high surface area per gram, e.g., higher than 30 $m^2/g$, preferably above 50 $m^2/g$ and most preferably greater than about 100 $m^2/g$ as measured by the BET method. Today's best photocatalysts reach about 300 $m^2/g$. In contrast, the surface area per gram of $TiO_2$ pigments is about 1–10 $m^2/g$. The difference is in the much smaller particles and crystallites of the photocatalyst particles.

In one embodiment of the invention, the combination of small (1–50 nm) photocatalytic particles with larger non-photocatalytic particles (approximately 150–250 nm) makes a useful self-cleaning paint composition. The small particles serve both as photocatalyst and as a binder for adhering the larger, light scattering, particles and adhering the particles to a surface.

The photocatalyst is activated by photons the energy of which exceeds the band gap of the photocatalyst. The preferred catalysts are activated when illuminated by approximately 2 to 6 eV photons (about 220–500 nm wavelengths), and preferably about 3.0 to 5.2 eV photons (about 240–400 mm), at an irradiance of at least 0.1 uW/$cm^2$ and generally not more than about 100 mW/$cm^2$. Titanium dioxide is photoactive in both its anatase and rutile phases, and for its photocatalytic function photon energies of about 3.0 to 4.5 eV are preferred. When excited by light in wavelengths shorter than about 410 nm (rutile) or about 390 nm (anatase), $TiO_2$ catalyzes oxidation-reduction reactions. For ZnO the preferred photon energies are about 3.3 to 4.5 eV. For $SnO_2$, $Ti_x(Zr_{1-x})O_2$, $CaTiO_3$ higher energy photons of at least 3.5 eV energy are preferred. For $WO_3$ and $Fe_2O_3$ photon energies as low as 2.8 eV are useful. $Ta_2O_5$ requires high photon energies, in excess of 5 eV.

The photocatalyst may catalyze oxidation or reduction reactions which serve to degrade a contaminant to a less noxious compound. Examples include oxidation of organic compounds such as formaldehyde or ethylene oxide and reduction of organic compounds such as carbon tetrachloride.

Co-catalyst

The rate of photocatalytic reactions may be increased, e.g. to accelerate the removal of high levels of contaminants, by the addition of co-catalysts. The photocatalytic compositions of the present invention may thus include as co-catalysts palladium, platinum, rhodium, ruthenium, tungsten, molybdenum, gold, silver, or copper, their oxides or sulfides to increase the rate of photocatalytic activity. Cocatalysts are preferably added in amounts of 0.01–2 catalyst weight % and are preferably incorporated in the surface, not in the bulk of the catalyst crystallites. See for example, Wang et al., 1992, *J. Am. Chem. Soc.* 114:5230–5234 and Kraeutler B. and Bard A. J., 1978, *J. Am. Chem. Soc.* 100:5985–5992.

Hydrophobic Enhancer

It has been surprisingly found that photocatalytic oxidation-reduction reactions catalyzed by photocatalytic pigments are enhanced in the presence of a hydrophobic, oxygen-permeable compound. For example, a photocatalyst binder composition containing a hydrophobic binder, such as siloxane, has enhanced photoactivity as compared with a composition containing a non-hydrophobic binder. In addition, a hydrophobic overcoating applied to a photocatalyst coated surface enhances the activity of the photocatalyst in its oxidation of organic phase soluble compounds, that is, compounds more soluble in organic solvents than in water. This enhanced activity is seen whether the photocatalyst is bound to a surface by conventional sintering methods or when the photocatalyst is bound to a surface via the binder compositions of the claimed invention.

The hydrophobic binder or overcoating serves to increase the contact angle with water by at least about 20°, and preferably by about 40°, when the third phase present is air. In a preferred embodiment, the contact angle between the coated surface and water when the third phase is air is between about 90° and about 180°.

Furthermore, the hydrophobic binder is permeable to the organic reactant and to molecular oxygen. It is also permeable to the products of the photocatalyzed reaction, particularly to carbon dioxide and to water.

Examples of appropriate hydrophobic binders or overcoatings include silicone and silane-derived compounds discussed above.

The hydrophobic binders or coatings of the catalyst extract organic molecules from fluid, e.g., air or water, concentrating these organics on the coated surface. The organic molecules, as well as oxygen, can rapidly diffuse in the coating, resulting in enhanced reactant flux to the photocatalyst dispersed in or coated by a hydrophobic binder or coating resulting in faster photocatalytic reactions. Thus the silicone, siloxane and silane-derived binders, as well as the microporous alumina and silica binders, are permeable to the reactants, which are organic molecules and oxygen in photooxidation reactions and halogenated organics and water in photocatalytic dehalogenation reactions.

Producing the photocatalyst-binder composition

The fluid photocatalyst-binder composition generally contains at least about 10% by weight photocatalyst and generally at least about 10% by weight binder. The composition must contain sufficient photocatalyst to achieve the photocatalytic activity required, e.g., oxidation of organic compounds, and sufficient binder to permit good adherence of the needed amount of photocatalyst particles to a surface. Generally, the composition will contain between about 10 and 90 weight percent of the photocatalyst particles and between 10 and 90 weight percent of the binder. Additional components may be co-catalysts, curing agents, enhancers, light-scattering pigments, solvents, surface active agents, viscosity affecting agents, stabilizers, and pH-controlling buffers.

A solid powder or an aqueous suspension of photocatalyst is added to a dispersion or solution of binder in water or in the organic solvent, or the catalyst may be formed in-situ, in a dispersed form in water or in a solvent as a colloid, known as a sol, which may convert, by cross-linking of the particles, to a network, usually a gel. The consistency of the fluid binder composition must be such that the photocatalyst particles may be dispersed therein and the composition applied to a surface by a method of choice. For example, porous alumina or silica may be suspended in water, and photocatalyst particles added to the suspension. Prepolymeric silicones including siloxanes may be dispersed or dissolved in an organic solvent containing photocatalyst particles.

Photocatalyst-binder compositions are generally prepared by combining the photocatalyst, binder, and solvent together and dispersing the photocatalyst through the use of a mixer with a high shear impellor operated at speeds up to 10,000 rpm. If not used immediately, the preparation can be stored in a sealed container to prevent evaporative loss of the solvent. If stored for long periods of time, the photocatalyst may settle and will need to be redispersed.

Application of photocatalyst-binder compositions

The photocatalyst-binder compositions of the present invention are thermostable. They can be applied from as liquid or, by dry-spraying as a powder. They can be applied to a large variety of surfaces, including glass, ceramic, metal, plastic, wood, painted surfaces, and the like. Application from the liquid composition may be by dip-coating, spraying, painting, or other methods known to apply liquid-dispersed materials onto a surface. Once applied to a surface, the composition is permitted to dry and/or cure, preferably at ambient temperature, or may be heated to assist in the drying or curing process. Preferably, if heat is used, the temperature is less than about 500° C., more preferably less than about 400° C., and most preferably less than about 200° C. When applied by dry-spraying or as a powder, heating, usually to the softening temperature of the binder that at this stage must be thermoplastic, is required.

In general, the photocatalyst-binder composition is applied to a surface and permitted to dry and/or cure under conditions suitable to remove solvents and cause polymerization and/or crosslinking of the binder composition and adherence of the photocatalyst-binder composition to the surface. The specific conditions will vary with the specific binder composition and the solvents, curing agents, and other components within the composition. For example, compositions containing alkylsilsesquioxanes, alumina, or silica may be dryed at low temperature, e.g., approximately 15° to 40° C. for about 1 to 4 hours. Compositions containing polymerizable precursors such as methyltrimethoxysilane, may be cured at approximately 100° to 200° C. for about 1 to 4 hours or at approximately 5° to 40° C. for about 72 to 240 hours.

It is preferred to carry out polymerization and crosslinking reactions in stages, so as to avoid the buildup of stress which may lead to cracking or peeling of the applied photocatalyst-binder composition.

Stress generally results from shrinkage of a film in the condensation polymerization reaction. It is therefore preferred to prepolymerize a polymer precursor to a material that is still able to plastically deform, i.e., undergo plastic deformation under stress rather than break. After the major dimensional change (shrinkage of the polymer) has taken place, either in the composition prior to application or after its application to a surface, further crosslinking can be used to obtain an increasingly tough, rigid, difficult to abrade coating. Thus, in the stages of curing, the binder progresses from being plastic and deformable to being increasingly rigid and hard, without cracking or peeling from the surface.

To obtain well separated polymerization and crosslinking stages, two or more differently reactive functional groups in the polymer precursor(s) can be used. The first group polymerizes to a non-crosslinked or less crosslinked prepolymer, to form a coating that easily deforms under stress. Subsequent crosslinking through another functional group or other groups produces a more rigid coating. For example, functional groups forming Si—O—Si bridges which further polymerize and crosslink at different rates include: Si—OH by loss of water; Si—H by air oxidation and loss of water; Si—Cl by reacting with water and loss of HCl and water; hydrogen; alkyl and aryl groups Si—OR by hydrolysis and loss of alcohol, where the rate depends on the function R; Si—OR by loss of ether, with the rate depending on R.

Methods of Use

The photocatalytic-binder compositions of the present invention can be used to produce photoactive surfaces for the removal of contaminants from a fluid, e.g., air, water, and the like or from surfaces coated with the composition. Thus, they can be advantageously applied to interior and exterior surfaces of buildings, walls, roofs, cars, boats, airplanes, windows, lamps, fixtures, air handling systems and purifiers, kitchen appliances, ceramic tiles and ultraviolet light emitting lamps, and air filtration units to render these surfaces virtually self-cleaning and to remove contaminants from a fluid stream such as air or water passing over the surface.

The compositions can be applied to form permanent coatings, similar in their permanence to paints on painted surfaces. Alternatively, they may form semi-permanent coatings, similar in their semi-permanence to waxes on surfaces, e.g., on a car or flooring. For example, a silicone-based wax can be mixed with a photocatalyst to form a self-cleaning wax, e.g., a wax on which organic contaminants are photocatalytically degraded. In this embodiment, the wax itself is the binder.

When continuously or periodically illuminated by sunlight or artificial light containing photons of the earlier specified energy, that are near UV photons in the case of the preferred photocatlysts, the coated surfaces retain a clean appearance, require less cleaning and painting, prevent growth of microorganisms such as mold, mildew and pathogenic organisms, and strip organic pollutants from a stream of air or water contacting the coated surface. The coated surface need not be exposed at all times to a light (UV) flux. However, the hydrophobic binder or overcoating is active at all times, extracting contaminants from water or air for later reactions when exposed to light.

The photocatalyst-binder composition of this invention can be applied to a surface by methods generally known for applying fluid (pourable) compositions, e.g., by painting, spraying, dipping, or spin coating. When the composition dries or cures on the surface, it forms an adherent, abrasion-resistant, thermostable film. Organic compounds which contact the film are absorbed or retained by the film. When exposed to UV light, the film transmits a substantial portion of the incident UV light to activate the photocatalyst particles and induce reactions which degrade the contacting organic compounds.

In a preferred embodiment, the photocatalyst-binder composition is applied to the surface of a reactor bed. Air or water passing through the reactor contacts the composition and contaminants contained in the air or water are subjected to photocatalytic reactions in the bed. In a fluidized bed reactor, the buoyancy of the coated particles, e.g., spheres or particles having an approximately spherical shape, is adjusted to permit particle and fluid circulation and particle distribution within the reactor. Thus, when the fluid (e.g., air or water) flows upward, the spheres are pushed up and suspended by force of flushing fluid. When the particles are buoyant in the fluid, the fluid flows downward through the bed of particles and drag force of the fluid distributes the particles in the bed. For upward flow of water in the reactor, a coated sphere density of about 1–2 $g/cm^3$ is useful. When water flows downward, for the spheres to be forced down, then rise due to their buoyancy, spheres of about 0.3–1.0 $g/cm^3$ are useful. Fluidized bed reactors with upward flow of air are also useful in extraction and photocatalytic removal of impurities from air. In this case, low density coated bubbles having approximately 0.05 to 1.0 $g/cm^3$ density are useful. At lower densities, the materials may be pulverized, and at higher densities they sink too fast.

In a most preferred embodiment, a photocatalyst-binder composition packed bed reactor is formed using wave-guiding glass spheres coated with the photocatalyst-binder composition as the packing of the reactor.

Figure 1:
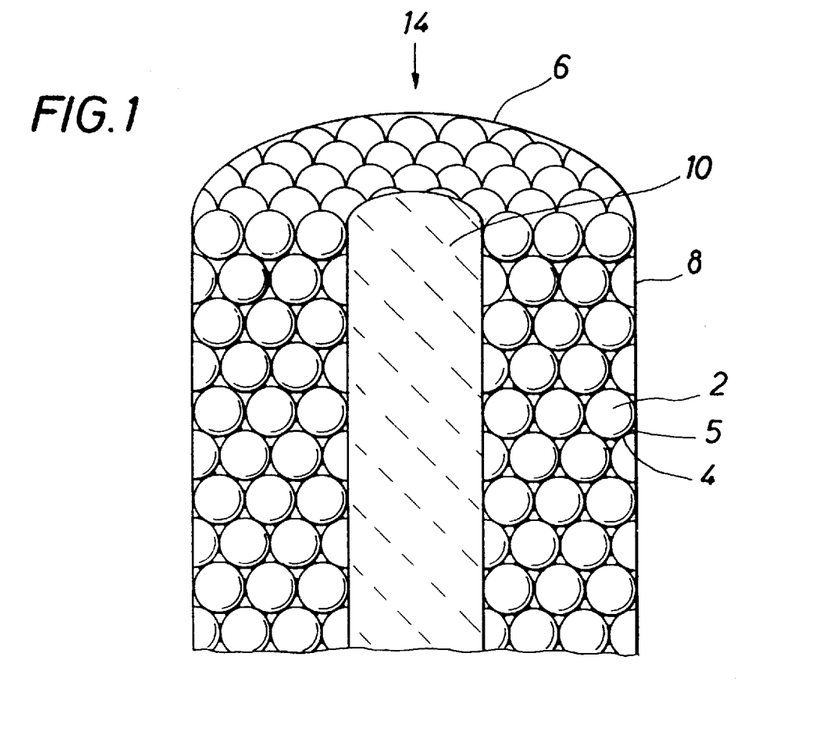
FIG. 1 is a diagrammatic sketch of a wave-guiding packed bed photoreactor, shown partially in cross-section.

As shown in FIG. 1, a wave-guiding photoreactor includes a packed bed of glass spheres 2, which are preferably and optionally coated with silicone, but only at points of contact 4 between the spheres. The packed bed 6 is formed within a conduit 8 which surrounds a source of ultraviolet light 10. Preferably, and optionally, a film of silicone 12 is positioned between the conduit 8 and the packed bed 6 such that the glass spheres which are immediately adjacent to the source of ultraviolet light 10 are intimately contacting the film of silicone 12. The glass spheres 2 are coated on all exposed surfaces, except at contact points 4 with other spheres or with the conduit 8, with the photocatalyst-binder composition of the present invention. The photoreactor also contains an inlet 14 and an outlet 16 for passage of air or water to be treated.

The wave-guiding photoreactor described above provides a high surface area of the photocatalyst which is illuminated for photoreactions. The positioning of the packed glass spheres and the absence of photocatalyst-binder composition at the contact points provides maximum light-distribution within the reactor.

The above-described wave-guiding photoreactor housing a source of UV light may be produced by placing a sufficient quantity of glass or UV transmitting photostable plastic spheres into a conduit to pack the conduit, so that the spheres optically contact one another and do not move freely within the conduit. The spheres may be heated to cause softening and adherence on cooling at contact points. In a preferred embodiment, the conduit is lined on its inner surface with a layer of silicone into which the spheres immediately adjacent to the conduit are imbedded. Also in the preferred embodiment, clear, UV-transmitting silicone is present on the glass spheres only at points of contact between the spheres. This may be accomplished, for example, by coating the beads with silicone prior to packing the conduit. After packing the conduit with the silicone-coated spheres, a solvent is applied to the packed bed to rapidly strip the silicone on the exposed surfaces of the spheres but not from between the spheres. Such a solvent is isopropanol. After removal of exposed silicone, the packed spheres have residual silicone only at contact points between spheres. Alternatively, the reactor bed is produced by layering one row of spheres at a time applying an amount of silicone to the contact points prior to applying the next sphere layer.

The fluid photocatalyst-binder composition is then poured through the inlet into the packed spheres with the excess draining through the outlet and permitted to dry and/or cure on the exposed surface of the spheres. This process results in a packed bed reactor containing photocatalyst-binder coated glass spheres except at points of contact between the spheres. Such a configuration allows for maximal transmission of UV light through the glass beads at their contact points and maximum exposure and absorption of UV-light by the photocatalyst in the reactor.

To achieve maximal wave-guiding of the UV light through the reactor, the index of refraction is approximately matched for the packing material, the contact material (silicone in the example described above) and the envelope of the UV lamp. Preferably, the index of refraction of the envelope of the lamp ($I_L$) is approximately equal to or smaller than the index of refraction of the contact material, i.e., silicone ($I_s$) which is approximately equal to or slightly greater than the index of refraction of the packing material ($I_p$).

Figure 2:
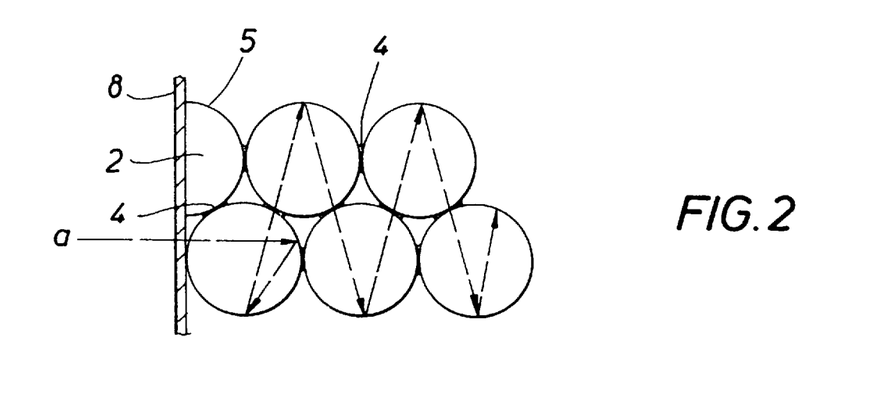
FIG. 2 is a diagrammatic sketch of a section of the packed bed reactor of FIG. 1, showing possible paths of reflected and transmitted UV light in the beads of the reactor.

The packed bed reactor of the present invention permits efficient transfer of UV light throughout the bed. UV light is transmitted through the contact points 4 and is absorbed by the photocatalyst coating (see FIG. 2).

In an alternative embodiment, the photocatalyst-binder compositions of the present invention are used to form a biocidal surface. Exposure of the surface to UV light induces photocatalytic reactions the products of which kill and degrade micro-organisms which are in contact with the surface.

EXAMPLES

The following examples are designed to illustrate certain aspects of the present invention. The examples are not intended to be comprehensive of all features and all embodiments of the present invention, and should not be construed as limiting the claims presented herein.

EXAMPLE 1

Poly(methylsilsesquioxane)-TiO$_2$ Composition

A photocatalyst-binder composition was prepared by mixing 27% by weight of poly(methylsilsesquioxane) also known as octakis(trimethylsiloxy)silsesquioxane (Gelest, Inc., Tullytown, Pa.); 6% by weight titanium dioxide (Degussa P-25, Degussa Corporation, Charlotte, N.C.); and 67% by weight isopropanol.

After mixing, the composition was applied to a borosilicate glass slide by dipping the slide into the composition mixture and draining off excess fluid. The coated slide was dried at ambient temperature (approximately 20° C.) permitting the isopropanol to evaporate for approximately two hours. When dry, the composition on the slide was translucent, and could not be removed from the glass surface by rubbing, could not be pulled off by applied cellophane tape (the "tape test") and could not be washed off with water.

The above procedure was repeated using the components described in Table 1 below, and applying the compositions to the various surfaces as indicated in the Table. Each resulted in a translucent coating which was not removed from the surface by rubbing, pulling with cellophane tape, or washing with water.

TABLE 1

| SURFACE | CATALYST | BINDER | SOLVENT |
| --- | --- | --- | --- |
| BOROSILCATE GLASS | 6% TiO$_2$ | 27% poly(methylsil sesquioxane) | 67% isopropanol |
| SODA-LIME GLASS | 6% TiO$_2$ | 27% poly(methylsil sesquioxane) | 67% isopropanol |
| FUSED QUARTZ | 6% TiO$_2$ | 27% poly(methylsil sesquioxane) | 67% isopropanol |
| AIR OXIDIZED SILICON WAFER | 6% TiO$_2$ | 27% poly(methylsil sesquioxane) | 67% isopropanol |
| BOROSILICATE GLASS | 3% TiO$_2$ | 28% poly(methylsil sesquioxane) | 69% isopropanol |
| SODA LIME GLASS | 3% TiO$_2$ | 28% poly(methylsil sesquioxane) | 69% isopropanol |
| FUSED QUARTZ | 3% TiO$_2$ | 28% poly(methylsil sesquioxane) | 69% isopropanol |

EXAMPLE 2

Aluminum Oxide—TiO$_2$ Bound to Glass

A photocatalyst-binder composition was prepared by mixing 0.5% by weight aluminum oxide (Vista Dispal, Austin, Tex.), 0.5% by weight titanium dioxide (Degussa P-25), and 99% by weight water.

A borosilicate glass slide was coated with the mixture by spraying the surface of the glass with a pressurized stream of the mixture. Spray-coating was accomplished by atomizing the binder-photocatalyst-solvent mixture using an atomizing spray nozzle (Spraying Systems, Wheaton, Ill.) pressured with nitrogen gas at 20 psi. The mixture flow rate was approximately 0.5 gallons per hour with a droplet size of approximately 30 microns. The coated slide was permitted to dry at ambient temperature (approximately 20° C.) for approximately two hours.

The above procedure was repeated using the components described in Table 2 below, applying the compositions to the various surfaces as indicated in the Table. When dry, the coating on the slide was translucent, and could not be removed from the glass surface by pulling with applied cellophane tape (tape test).

TABLE 2

| SURFACE | CATALYST | BINDER | SOLVENT |
|---|---|---|---|
| BOROSILICATE GLASS | 0.5% $TiO_2$ | 0.5% AlO | 99% $H_2O$ |
| SODA LIME GLASS | 0.5% $TiO_2$ | 0.5% AlO | 99% $H_2O$ |
| FUSED QUARTZ | 0.5% $TiO_2$ | 0.5% AlO | 99% $H_2O$ |
| AIR OXIDIZED SILICON WAFER | 0.5% $TiO_2$ | 0.5% AlO | 99% $H_2O$ |

EXAMPLE 3

Photooxidation of Volatile Organic Compounds

A coated fused quartz substrate prepared as described for Example 1 (6% $TiO_2$; 27% poly(methylsilsesquioxane); 67% isopropanol) was tested for its ability to photooxidize volatile organic compounds by placing the coated substrate in a gas-tight glass vessel filled with air at atmospheric pressure. The vessel was provided with a 4.9 $cm^2$ window through which UV light was passed to illuminate the titania-coated substrate. The gas volume of the vessel was 49 $cm^3$. The size of the coated substrate was 4.9 $cm^2$.

Toluene (10 μl) was injected into the vessel through a septum port and allowed to vaporize. The initial toluene concentration was 1.9 μmoles/$cm^3$ of air. UV light (12.2 mw/$cm^2$ at 365 nm) was then used to illuminate the photocatalyst-coated substrate. The concentration of toluene as a function of time was monitored by taking gas samples using a gas-tight syringe and measuring the amount of toluene by gas chromatography with flame ionization detection. Table 3 shows the decrease in the amount of gaseous toluene as a function of time.

TABLE 3

| TIME (HR) | TOLUENE CONCENTRATION (MOLES/$CM^3$) |
|---|---|
| 0.0 | $1.90 \times 10^{-6}$ |
| 0.5 | $1.43 \times 10^{-6}$ |
| 1.0 | $1.22 \times 10^{-6}$ |
| 1.5 | $1.07 \times 10^{-6}$ |

The above experiment was repeated using a fused quartz substrate coated with the aluminum-oxide-$TiO_2$ composition prepared as described for Example 2 (0.5% $TiO_2$; 0.5% AlO; 99% water). Table 4 shows the decrease in the amount of gaseous toluene as a function of time.

TABLE 4

| TIME (HR) | TOLUENE CONCENTRATION (MOLES/$CM^3$) |
|---|---|
| 0.0 | $1.9 \times 10^{-6}$ |
| 0.5 | $3.0 \times 10^{-7}$ |
| 1.0 | $1.9 \times 10^{-7}$ |

UV = 2.6 mW/sq. cm

EXAMPLE 4

Application of a hydrophobic coating to a hydrophilic photocatalytic surface

The photocatalytic coating in Example 2 was made hydrophobic by spraying onto the surface of the coating one of the following solutions: 0.1% Glassclad 6C (United Chemical Technologies) in isopropanol or 0.1% Glassclad 18 (United Chemical Technologies) in water. Glassclad 6C is a chlorine-terminated poly(dimethylsiloxane) and Glassclad 18 is a hydroxyl-terminated poly(dimethylsiloxane). Soda-lime glass was the substrate material for the photocatalytic coating. An atomizing sprayer with nitrogen or carbon dioxide as propellant gas was used. Liquid droplets large enough to be visible were not allowed to form on the surface. Spraying continued until transmission FTIR of the glass and coating revealed a peak at approximately 3000 $cm^{-1}$ with an absorbance of 0.05, indicating the presence of Glassclad on the surface of the photocatalytic coating.

EXAMPLE 5

Photooxidation of toluene on a hydrophobic photoactive coating

The photooxidation of toluene by the coating from Example 2, made hydrophobic with glassclad 6C using the procedure in Example 3, was tested by placing the coated hydrophobic substrate of Example 3 (fused quartz) in a gas-tight glass vessel filled with air at atmospheric pressure. The gas-tight vessel had a 4.9 $cm^2$ window through which UV light could pass and illuminate the photocatalyst-coated substrate. The gas volume of the vessel was 49 $cm^3$.

Toluene (10 μL) was injected into the vessel through a septum port and allow to vaporize. The initial toluene concentration was 1.9 μmoles/$cm^3$ of air. UV light (2.6 mW/$cm^2$ at 365 nm) was then used to illuminate the titania coated substrate. The concentration of toluene as a function of time was monitored by taking gas samples using a gas-tight syringe and measuring the amount of toluene using gas chromatography with flame ionization detection. Table 5 shows the decrease in the amount of gaseous toluene as a function of time. Within the first 30 minutes, the concentration of toluene was decreased to a level below that seen without the hydrophobic overcoating in 1.5 hours.

TABLE 5

| TIME (HR) | TOLUENE CONCENTRATION (MOLES/$CM^3$) |
|---|---|
| 0.0 | $1.90 \times 10^{-6}$ |
| 0.5 | $2.60 \times 10^{-7}$ |
| 1.0 | $1.5 \times 10^{-7}$ |

EXAMPLE 6

Photodegradation of carbon tetrachloride ($CCl_4$)

The ability of the coating from Example 2 to photodegrade gas-phase $CCl_4$ was tested by coating a calcium fluoride infrared crystal with the photocatalyst-binder composition as described for Example 2. The coated substrate ($CaF_2$) was placed in a gas-tight glass vessel filled with air at atmospheric pressure. The gas-tight vessel had a 4.9 $cm^2$ window through which UV light could pass and illuminate the titania-coated substrate. The gas volume of the vessel was 49 $cm^3$. $CCl_4$ (10 μL) was injected into the vessel through a septum port and allow to vaporize. The initial $CCl_4$ concentration was 1.15 μmoles/$cm^3$ of air. UV light (6 mW/$cm^2$ at 365 nm) was then used to illuminate the titania coated substrate for 24 hours. After the 24 hour period had elapsed, the cell was removed from the UV light and placed in an infrared spectrophotometer to measure the amount of carbon dioxide ($CO_2$) generated from the degradation of $CCl_4$. After 24 hours of UV illumination, approximately $4.6 \times 10^{-7}$ moles of $CCl_4$ was converted to $CO_2$.

EXAMPLE 7

Surface Cleaning Capability

A sample of soda-lime glass coated with a hydrated aluminum oxide-$TiO_2$ composition was prepared as described for Example 2 (0.5% $TiO_2$; 0.5% hydrated aluminum oxide; 99% water).

The surface cleaning ability of the coated substrate was tested by placing 10 μl of a 1% solution of stearic acid in isopropanol on the surface of the film coating and exposing it to UV light (4 mw/cm² at 365 nm) by front illumination, i.e., coated side. The amount of stearic acid on the glass was monitored by transmission infrared spectroscopy through soda-lime glass.

Stearic acid showed a major absorption peak at 2930 cm$^{-1}$ attributed to C–H stretching vibrations. The integrated area of this peak was related through calibration to the amount of stearic acid applied, then used to measure photoreactive removal of organic matter from the surface as a function of time.

The amount of stearic acid remaining on the surface after exposure was calculated from the integrated areas of the peaks at or near 2930 cm$^{-1}$ using the percentage of the area prior to UV illumination. Table 6 shows the change in stearic acid concentration as a function of time.

TABLE 6

| ILLUMINATION TIME (HR) | SURFACE CONCENTRATION OF STEARIC ACID (MOLE/CM²) |
|---|---|
| 0.0 | 4.22 × 10$^{-7}$ |
| 0.5 | 4.08 × 10$^{-7}$ |
| 1.0 | 3.92 × 10$^{-7}$ |
| 1.5 | 3.77 × 10$^{-7}$ |
| 2.0 | 3.61 × 10$^{-7}$ |
| 2.5 | 3.45 × 10$^{-7}$ |
| 3.0 | 3.34 × 10$^{-7}$ |

There was no change when the samples were kept in the dark for 48 hours.

This study was repeated as described above, except that the film was back-illuminated, i.e., through the uncoated side of the substrate. Table 7 shows the change in the ratio of residual to initial amounts of stearic acid on the surface as a function of time.

TABLE 7

| TIME (HR) | FRACTION OF INITIAL CONCENTRATION |
|---|---|
| 0 | 1.00 |
| 2 | 0.7 |
| 3.5 | 0.6 |

This study was further repeated, using the following photocatalyst-binder composition applied to the soda-lime glass substrate: 3% $TiO_2$; 28% poly(methylsilsesquioxane); 69% isopropanol. The sample was front illuminated. The change in ratio of residual to initial amounts of stearic acid as a function of time are shown in Table 8

The study was repeated using 6% $TiO_2$; 27% poly (methysilsesquioxane) and 67% isopropanol. FIG. 8 shows the change in the ratio of stearic acid remaining as a function of time.

TABLE 8

| TIME (HR) | FRACTION OF INITIAL CONCENTRATION |
|---|---|
| 0 | 1.00 |
| 2 | 0.65 |
| 5 | 0.58 |
| 72 | 0.35 |

This study was further repeated using 10% $TiO_2$, 20% methyltrimethoxysilane, 61.2% isopropanol, 8.1% water, and 0.7% 3N Hcl. Table 9 showns the change in stearic acid concentration as a function of time.

TABLE 9

| TIME (HR) | SURFACE CONCENTRATION OF STEARIC ACID |
|---|---|
| 0 | 4.22 × 10$^{-7}$ |
| 1 | 3.55 × 10$^{-7}$ |
| 2 | 3.27 × 10$^{-7}$ |
| 3 | 3.01 × 10$^{-7}$ |
| 4 | 2.64 × 10$^{-7}$ |

EXAMPLE 8

Photooxidative Surface Cleaning with a $SnO_2$-containing film

The surface cleaning ability of a coating of tin oxide on glass was tested by placing 100 μL of a 1% solution of stearic acid in isopropanol on the surface of the coating and exposing it to UV light (1 mW/cm² at 254 nm) by front illumination. Tin oxide-coated glass was prepared by spin-coating at 2000 rpm colloidal tin oxide (18% in water, Alfa Johnson Matthey, Ward Hill, Mass.) on a soda-lime glass substrate and drying the coated-substrate for one hour at 100° C. The amount of stearic acid on the surface was monitored by transmission infrared spectroscopy through the soda-lime glass. At 2930 cm$^{-1}$, stearic acid shows a strong absorption peak resulting from C–H stretch. The absorbance peak was integrated and the percentage of the area prior to UV illumination was used to calculate the amount of stearic acid remaining on the surface. Table 9 shows the change in stearic acid concentration as a function of time for front illumination.

TABLE 9

| ILLUMINATION TIME (HR) | SURFACE CONCENTRATION OF STEARIC ACID (MOLE/CM²) |
|---|---|
| 0.0 | 9.10 × 10$^{-8}$ |
| 17.5 | 0.71 × 10$^{-8}$ |

EXAMPLE 9

Application to Metal

A photocatalyst-binder composition was prepared as described for Example 1, using 6% $TiO_2$; 27% poly (methylsilosesquioxane); 67% isopropanol. After mixing, the composition was applied by brush painting as an overcoating onto the driver's side of the hood and roof of a white automobile and allowed to dry at ambient temperature. As a control, an identical composition containing the binder, poly(methylsilsesquioxane), but no $TiO_2$ photocatalyst, was similarly applied to the passenger side.

The isopropanol was permitted to evaporate under ambient conditions, (approximately 29°±4° C.). The resultant coating was translucent and could not be removed from the auto's surface by rubbing, pulling with cellophane tape, or washing with water. the coating retained its adhesion, integrity, and remained colorless during two months of outdoor weathering in ambient sunlight, rain, freezing temperatures, wind, and driving. The driver's side overcoated with the $TiO_2$-binder composition was consistently cleaner than the passenger side, and was essentially stain, grime, and soot free.

EXAMPLE 10

Ultraviolet transparency of poly (methylsilsesquioxane)

The transparency of a 100 $\mu$m film of poly (methylsilsesquioxane) on quartz was determined by measuring the absorbance of the film using a UV/Vis spectrophotometer. The quartz substrate was spray-coated with a solution of polymethyl silsesquioxane and isopropanol. Table 10 shows the percent transmittance at two different wavelengths. Transmittance of quartz is approximately 90%.

TABLE 10

| WAVELENGTH (nm) | ABSORBANCE | % TRANSMITTANCE |
|---|---|---|
| 250 | 0.38 | 42 |
| 370 | 0.42 | 38 |

EXAMPLE 11

Ultraviolet transparency of polymerized film of methyltrimethoxysilane

The transparency of a 100 $\mu$m film of polymerized methyltrimethoxysilane on quartz was determined by measuring the absorbance of the film using a UV/Vis spectrophotometer. Table 11 shows the percent transmittance of two different wavelengths.

TABLE 11

| WAVELENGTH (nm) | ABSORBANCE | % TRANSMITTANCE |
|---|---|---|
| 250 | 0.14 | 72 |
| 370 | 0.11 | 78 |

EXAMPLE 12

Photodeposition of Platinum on Colloidal Tin Oxide

Platinum was deposited on tin oxide photoelectrochemically. $H_2PtCl_6$ (Aldrich Chemical, St. Louis, Mo.) (0.8 mL) was dissolved in 80 mL of deionized water. One mL of glacial acetic acid (Aldrich Chemical) was added as a hole scavenger. The pH of the mixture was adjusted to 4 by the addition of 0.5 mL of 2M $Na_2CO_3$ (Aldrich Chemical) in deionized water. Colloidal $SnO_2$ (Alfa Johnson Matthey, Ward Hill, Mass.) (0.26 g) was then added to the solution and the mixture was illuminated for 0.5 hours with 254 nm light at approximately 2.3 mW/cm$^2$ while stirring. The temperature of the plating solution was maintained at 43° C. and continuously purged with $N_2$. Following the deposition, the solution was dialyzed with a 500 molecular weight cutoff dialysis membrane to remove excess platinic acid. The tin oxide was kept in colloidal form. The amount of Pt photodeposited on the semiconductor surface was approximately 0.1% by weight.

EXAMPLE 13

Enhancement of the Rate of Stearic Acid Photooxidation on Tin Oxide by Platinum Modification The photoactivity of nanocrystalline tin oxide (Alfa Johnson Matthey) and of the Pt-modified nanocrystalline tin oxide prepared as described in Example 11 was determined by measuring the photooxidation rate of stearic acid films on a nanocrystalline $SnO_2$ coated substrate. The coated substrates (soda lime glass or quartz) were prepared by spin coating colloidal $SnO_2$ or Pt-modified colloidal $SnO_2$ onto the substrate at 2000 rpm. The $SnO_2$ or Pt-modified $SnO_2$ coverage was approximately 0.3 mg/cm$^2$. After spin coating, the substrates were dried at 100° C. for one hour. After the coated substrate had dried and cooled, 100 $\mu$L of 0.5% stearic acid in isopropanol was deposited on the $SnO_2$ or Pt-modified $SnO_2$-coated surface. After the solvent evaporated, transmission infrared spectroscopy (i.e., through the $SnO_2$-coated substrate) between 3000 cm$^{-1}$ and 2900 cm$^{-1}$ was used to determine the initial amount of stearic acid on the surface. The peaks resulting from the C–H stretch in this region were integrated. The stearic acid coverage on the $SnO_2$ or Pt—$SnO_2$ coated surface was approximately 4.6× 10$^{-7}$ moles/cm$^2$. Fourier transform infrared spectroscopy was performed on a Nicholet Magna-IR:Spectrophotometer Model 750 FTIR with a KBr beam splitter and MCT detector. Averaging was performed over 50 scans with a nominal resolution of 4 cm$^{-1}$. The surfaces were then front illuminated with 254 nm ultraviolet light at approximately 2.3 mW/cm$^2$. The illuminated surface area was 10.2 cm$^2$. After the illumination period, infrared spectroscopy was again used to determine the amount of stearic acid remaining on the surface. The fraction of the initial stearic acid concentration remaining on the surface is shown in Table 12 as a function of illumination time.

TABLE 12

| Time (min) | $C/C_o$ Pt—$SnO_2$ | $C/C_o$ $SnO_2$ |
|---|---|---|
| 0 | 1.00 | 1.00 |
| 200 | 0.45 | 0.80 |
| 780 | 0.16 | 0.59 |
| 2600 | 0.003 | 0.43 |

EXAMPLE 14

Measuring Abrasion Resistance by the Scratch Hardness Test

The pencil hardness test as described in: *Paint and Surface Coating: Theory and Practice*, R. Lambourne, ed, 1987, John Wiley & Sons, N.Y., pages 674–675 was used to determine the abrasion resistance of several photocatalyst compositions coated onto surfaces. The coated surfaces were prepared as described below.

1. A titanium dioxide-containing photoactive surface was prepared by coating soda-line glass with a solution containing 99% wt water, 0.5% wt aluminum oxide (Vista Dispal), and 0.5% wt titanium dioxide (Degussa P-25). The solution was sprayed onto the glass as described for Example 1; applied to the glass by each of three coating methods: spin coated onto glass at 2000 RPM for about one minute; and dip coating, allowing excess solution to drain. In each case, water was allowed to evaporate under ambient conditions leaving behind a translucent coating.

2. A titanium dioxide-containing photoactive surface was prepared by coating soda-lime glass by the three methods described above with a solution containing 99% wt water, 0.5% wt colloidal silica (Alfa Johnson Matthey), and 0.5% wt titanium dioxide (Degussa P-25). Water was allowed to evaporate under ambient conditions, leaving behind a translucent coating.

3. A titanium dioxide-containing photoactive surface was prepared by coating soda-lime glass by the three methods described above with a solution containing 67% wt isopropanol, 27% wt poly(methylsilsesquioxane), and 6% wt titanium dioxide (Degussa P-25). Isopropanol was allowed to evaporate under ambient conditions, leaving behind a translucent coating.

4. A titanium dioxide-containing photoactive surface was prepared by coating soda-lime glass according to the following procedure: A solution of 50 g methyltrimethoxysilane, 13.3 g water, and 100 g of isopropanol was mixed well and 0.1 g of 3N HCl was added while rapidly mixing. The mixture was allowed to partially polymerize for 24 hours at 25° C., forming a sol. To this sol, 16.3 g of titanium dioxide (Degussa P-25) was added and dispersed into the sol by rapid mixing. The titania-sol mixture was then coated on soda-lime glass by spincoating at 2000 RPM for about one minute. Samples of the coated glass were allowed to cure at 100° C. for 4 hours or at 25° C. for 72 hours. After curing, the coated slides were then soaked in 10% HCl for 24 hours, rinsed with water, and dried at ambient temperatures.

The scratch-hardness test was applied to each sample of coated glass described above by pushing pencil lead firmly along the surface of the film at about a 45° angle to the surface. The abrasion-resistance value for each coating was the maximum carbon hardness value, e.g., the highest number of pencil carbon which did not damage or break the coating. Using pencil leads No. 1 through No. 3, each of the coatings described above had a scratch-hardness value of at least 2. Those coatings using the titania-sol mixture had a higher scratch-hardness value, withstanding a No. 3 pencil. The No. 3 pencil was the hardest used, thus the abrasion resistance of the titania-sol mixture was at least 3.

We claim:

1. A composition comprising:
    particles of a photocatalyst activated by light, said particles having a diameter of about 1–100 nm and a surface area of at least 30 m²/g; said photocatalyst capable of catalyzing oxidation or reduction reactions:
        a binder for adhering said particles to a surface, said binder consisting essentially of a substantially non-oxidizable polymer having a backbone sequence of 12 or more atoms, where no more than one in six backbone atoms is carbon, the binder consisting of less than 20 wt % oxidizable carbon and hydrogen atoms;
        wherein the particles are dispersed throughout said binder, and wherein the composition forms an abrasion-resistant, thermostable and adherent film when applied to a surface, the binder transmitting a substantial portion of activating light to activate the photocatalyst particles;
    said composition, when applied to a surface and in contact with an organic compound, being Effective, in the presence of activating light, to degrade at least a portion of said organic compound.

2. The composition of claim 1, wherein said binder is a polymer precursor, a non-crosslinked polymer, or a partially crosslinked polymer prior to its curing.

3. A composition comprising:
    particles of a photocatalyst activated by light, said particles having a diameter of about 1–100 nm, said photocatalyst capable of catalyzing oxidation or reduction reactions;
    a binder for adhering said particles to a surface, said binder consisting essentially of hydrated aluminum oxide, hydrated silicon oxide, colloidal tin dioxide, or mixtures thereof;
    wherein the particles are dispersed throughout said binder and wherein the composition forms an abrasion-resistant, thermostable and adherent film when applied to a surface, the binder transmitting a substantial portion of the activating light to activate the photocatalyst particles;
    said composition, when applied to a surface and in contact with an organic compound, being effective, in the presence of activating light, to degrade at least a portion of said organic compound.

4. The composition of claim 1, wherein said binder is a silicone.

5. The composition of claim 4, wherein said binder is a cyclomer or a ladder polymer.

6. The composition of claim 4, wherein said binder includes a silicon atom bound to a terminating group comprising H, alkyl group, or aryl group.

7. The composition of claim 1, further comprising a curing agent.

8. A curable composition comprising;
    (a) light-activated photocatalyst particles having a surface area of at least about 30 m²/g;
    (b) a binder consisting essentially of a substantially non-oxidizable polymer, hydrated aluminum oxide, hydrated silicon oxide, colloidal tin oxide, or mixtures thereof wherein the particles of the photocatalyst are dispersed in the binder, and wherein the binder transmits a substantial portion of activating light to activate the photocatalyst particles;
    said composition, when applied to a surface and in contact with an organic compound, being effective, in the presence of activating light, to degrade at least a portion of said organic compound.

9. The composition of claim 8, wherein the surface area is at least about 100 m²/g.

10. The composition of claim 8, wherein the composition is curable upon drying at ambient temperature or by the application of heat, radiation or curing agent.

11. The composition of claim 10, wherein the composition is curable at ambient temperature.

12. The composition of claim 1, wherein said binder, at a thickness of approximately one micron, absorbs less than about 50% of activating photons.

13. The composition of claim 1, wherein said photocatalyst catalyzes oxidation of organic compounds by air or oxygen.

14. The composition of claim 1, wherein said photocatalyst is selected from the group consisting of $TiO_2$, Zno, $CaTiO_3$, $SnO_2$, $MoO_3$, $Fe_2O_3$, $WO_3$, $Nb_2O_5$, SiC, and $Ti_x(Zr_{1-x})O_2$, where x has a value between 0 and 1.

15. The composition of claim 1, wherein said photocatalyst is $TiO_2$, ZnO, $SnO_2$, or a mixture thereof.

16. The composition of claim 1, wherein said composition, when applied to a surface and dried or cured, transmits no more than about 10% of activating light to the underlying surface.

17. A composition comprising:

particles of a photocatalyst responsive to activating light, said particles having a diameter of about 1–100 nm, and a surface area at least about 30 $m^2/g$; and a substantially non-oxidizable binder for adhering said particles to a surface, said binder consisting essentially of an inorganic colloid or a polymer having a backbone sequence of 12 or more atoms where no more than one in six backbone atoms is carbon, the binder having fewer than 20% by weight oxidizable carbon and hydrogen atoms, wherein the particles are dispersed in the binder and the composition forms an abrasion-resistant, thermostable and adherent film, the binder transmitting a substantial portion of activating light to activate the photocatalyst particles;

said composition, when applied to a surface and in contact with an organic compound, being effective, in the presence of activating light, to degrade at least a portion of said organic compound.

18. The composition of claims 17, wherein said binder is selected from the group consisting of hydrated aluminum oxide, hydrated silicon oxide, colloidal tin oxide, and mixtures thereof.

19. The composition of claim 17, wherein said binder is a silicone polymer.

20. The composition of claim 17, further comprising pigment particles forming a self-cleaning paint.

21. A composition comprising:

particles of a photocatalyst activated by light, said particles having a diameter of about 1–100 nm and a surface area at least about 30 $m^2/g$; and a substantially non-oxidizable binder for adhering said particles to a surface, wherein the particles arc dispersed in the binder in the absence of photoactivity-masking agents, and wherein the composition forms an abrasion-resistant, thermostable and adherent film when applied to a surface, the binder transmitting a substantial portion of activating light to activate the photocatalyst particles;

said composition, when applied to a surface and in contact with an organic compound, being effective, in the presence of activating light to degrade at least a portion of said organic compound.

22. The composition of claim 21, wherein said binder cures at a temperature less than approximately 85° F.

23. The composition of claim 21, wherein said binder cures at ambient temperature.

24. The composition of claim 21, wherein said binder is a silicone.

25. The composition of claim 21, wherein said binder is a cyclomer or a ladder polymer.

26. The composition of claim 24, wherein said binder includes a silicon atom bound to a terminating group comprising H, alkyl group, or aryl group.

27. The composition of claim 21, further comprising a curing agent.

28. The composition of claim 21, wherein said binder, at a thickness of approximately one micron, absorbs less than about 50% of activating photons.

29. The composition of claim 21, wherein said photocatalyst is selected from the group consisting of $TiO_2$, Zno, $CaTiO_3$, $SnO_2$, $MoO_3$, $Fe_2O_3$, $WO_3$, $Nb_2O_5$, SiC, and $Ti_x(Zr_{1-x})O_2$, where x has a value between 0 and 1.

30. The composition of claim 29, wherein said photocatalyst is $TiO_2$, ZnO, $SnO_2$, or a mixture thereof.

31. The composition of claim 21, wherein said composition, when applied to a surface and dried or cured, transmits no more than about 10% of incident ultraviolet light to the underlying surface.

32. The composition of claim 21, further comprising pigment particles forming a self-cleaning paint.

* * * * *

UNITED STATES PATENT AND TRADEMARK OFFICE
CERTIFICATE OF CORRECTION

PATENT NO. : 5,854,169

DATED : DECEMBER 29, 1998

INVENTOR(S) : HELLER ET AL.

It is certified that error appears in the above-identified patent and that said Letters Patent is hereby corrected as shown below:

On the title page, item [56]:

Other Publications, Col. 2: in "Lay, P. et al." reference, "1996" should read —1986—

Col. 22, line 4: "Effective" should read —effective—

Signed and Sealed this

Thirteenth Day of June, 2000

*Attest:*

Q. TODD DICKINSON

*Attesting Officer*      *Director of Patents and Trademarks*